United States Patent
Smith et al.

(10) Patent No.: US 11,976,926 B2
(45) Date of Patent: May 7, 2024

(54) WORLD GEODETIC SYSTEM TO CARTESIAN COORDINATE CONVERSION FOR DRIVING

(71) Applicant: Aptiv Technologies AG, Schaffhausen (CH)

(72) Inventors: Matthew R. Smith, Springboro, OH (US); Tanto Sugiarto, West Lafayette, IN (US)

(73) Assignee: Aptiv Technologies AG, Schaffhausen (CH)

( * ) Notice: Subject to any disclaimer, the term of this patent is extended or adjusted under 35 U.S.C. 154(b) by 122 days.

(21) Appl. No.: 17/367,265

(22) Filed: Jul. 2, 2021

(65) Prior Publication Data

US 2022/0373334 A1 Nov. 24, 2022

Related U.S. Application Data

(60) Provisional application No. 63/191,250, filed on May 20, 2021.

(51) Int. Cl.
*G01C 21/20* (2006.01)
*G05D 1/00* (2006.01)
*G05D 1/02* (2020.01)

(52) U.S. Cl.
CPC ........... *G01C 21/20* (2013.01); *G05D 1/0212* (2013.01); *G05D 2201/0213* (2013.01)

(58) Field of Classification Search
CPC ................. G01C 21/20; G05D 1/0212; G05D 2201/0213
See application file for complete search history.

(56) References Cited

U.S. PATENT DOCUMENTS

2016/0018229 A1\* 1/2016 Lee ........................ G01C 21/34
701/409

OTHER PUBLICATIONS

"Transverse Mercator: Bowring Series." Formulasearchengine, https://en.formulasearchengine.com/index.php?title=Transverse_Mercator%3A_Bowring_series oldid=267368. (Year: 2014).\*

(Continued)

*Primary Examiner* — Kenneth J Malkowski
*Assistant Examiner* — Carville Albert Hollingsworth, IV
(74) *Attorney, Agent, or Firm* — Harness, Dickey & Pierce, P.L.C.

(57) ABSTRACT

Methods and systems are described that enable world geodetic system (WGS) to cartesian coordinate conversion for driving. A path of a vehicle comprising lane-group segments (LGSs) is received. The LGSs comprise respective origins in WGS coordinates, respective path points in WGS coordinates; and respective groups of constants. For a first of the LGSs, global cartesian path coordinates are calculated, based on modified Bowring techniques, for the path points of the first LGS. The coordinates are calculated using the constants of the first LGS and respective differences between the path points of the first LGS and an origin of the first LGS. The vehicle can navigate along the path using the global cartesian path coordinates calculated for the first LGS. By using modified Bowring techniques and pre-calculated constants for each LGS of the path, accuracy can be maintained over long distances and across boundaries without requiring substantial computational overhead.

20 Claims, 7 Drawing Sheets

(56) References Cited

OTHER PUBLICATIONS

"Extended European Search Report", EP Application No. 22169676. 8, dated Oct. 10, 2022, 10 pages.
Murphy, et al., "Rectilinear Coordinate Frames for Deep Sea Navigation", Oct. 2010, 10 pages.
"Geocentric Latitude", PROJ 9.1.1, Retrieved from https://proj.org/operations/conversions/geoc.html on Feb. 28, 2023, 2 pages.

* cited by examiner

WORLD GEODETIC SYSTEM TO CARTESIAN COORDINATE CONVERSION FOR DRIVING

CROSS-REFERENCE TO RELATED APPLICATION

This application claims the benefit under 35 U.S.C. 119(e) of U.S. Provisional Application No. 63/191,250, filed May 20, 2021, the disclosure of which is incorporated by reference in its entirety herein.

BACKGROUND

Paths for advanced safety functions and semi-autonomous or autonomous driving are often provided by navigation systems in World Geodetic System (WGS) coordinates (e.g., latitude, longitude, and elevation). Most driving systems, however, are unable to use WGS coordinates and often necessitate cartesian coordinates (e.g., x, y, z). Therefore, there is often a need to project WGS path coordinates to cartesian coordinates for use in vehicle operations.

A few techniques have been developed to project WGS coordinates to cartesian coordinates, though they all suffer from certain drawbacks. For example, one technique relies on a Universal Transverse Mercator (UTM) conversion. Not only is a UTM conversion computationally cumbersome, but it can cause problems if a path of a vehicle crosses a zone boundary. For example, heading becomes particularly inaccurate near zone boundaries. Another technique relies on a Bowring conversion, which is less cumbersome than the UTM conversion but often requires second and third-order terms to address northings at different latitudes. Furthermore, this Bowring method begins to have problems over longer distances (e.g., 100 km or more).

SUMMARY

Aspects described below include a method, performed by a processor of a vehicle, configured to perform a world geodetic system to cartesian coordinate conversion for semi-autonomous or autonomous driving. The method includes receiving a path of the vehicle comprising one or more lane-group segments (LGSs). The LGSs comprise respective origins in WGS coordinates, respective path points in WGS coordinates; and respective groups of constants. The method further comprises, for a first LGS of the LGSs, calculating global cartesian path coordinates for the path points of the first LGS based on the constants of the first LGS and respective differences between the path points of the first LGS and an origin of the first LGS. The method also comprises navigating the vehicle along the path using the global cartesian path coordinates calculated for the path points of the first LGS.

Aspects described below also include a system, configured to be implemented in a vehicle, to perform a world geodetic system to cartesian coordinate conversion for driving. The system comprises a processor and computer-readable storage media comprising instructions that, when executed by the processor, cause the processor to receive a path of the vehicle comprising one or more LGSs. The LGSs comprise respective origins in WGS coordinates, respective path points in WGS coordinates; and respective groups of constants. The instructions further cause the processor to, for a first LGS of the LGSs, calculate global cartesian path coordinates for the path points of the first LGS based on the constants of the first LGS and respective differences between the path points of the first LGS and an origin of the first LGS. The instructions also cause the processor to navigate the vehicle along the path using the global cartesian path coordinates calculated for the path points of the first LGS.

BRIEF DESCRIPTION OF THE DRAWINGS

Systems and techniques enabling a world geodetic system to cartesian coordinate conversion for driving are described with reference to the following drawings. The same numbers are used throughout the drawings to reference like features and components.

DETAILED DESCRIPTION

Overview

Advanced safety and semi-autonomous or autonomous vehicle operations often require vehicle paths in cartesian coordinates. Because associated navigation systems often provide the paths in WGS coordinates, conversions from WGS coordinates to cartesian coordinates are often performed while a vehicle is driving. A few techniques have been developed to accomplish such conversions. However, they all have respective drawbacks. For example, they may not have high accuracy within a range of vehicle control (e.g., 500 m), they may involve cumbersome or computationally intensive conversions, they may not allow for easy and accurate back-conversion to WGS coordinates, they may suffer if a path approaches or crosses a zone-boundary, they may have discontinuities, they may not allow for easy comparisons of same locations on different drives with different starting points, or they may not maintain high precision across all latitudes.

Methods and systems are described that enable world geodetic system to cartesian coordinate conversion for driving. A path of a vehicle comprising one or more LGSs is received. The LGSs comprise respective origins in WGS coordinates, respective path points in WGS coordinates; and respective groups of constants. For a first LGS of the LGSs, global cartesian path coordinates are calculated for the path points of the first LGS based on the constants of the first LGS and respective differences between the path points of the first LGS and an origin of the first LGS. The calculations are based on a modified Bowring method. The vehicle is then navigated along the path using the global cartesian path coordinates calculated for the path points of the first LGS. By using the modified Bowring method and pre-calculated constants for each of the LGSs of the path, accuracy can be maintained over long distances and across boundaries without requiring substantial computational overhead.

Example Environment

Figure 1:
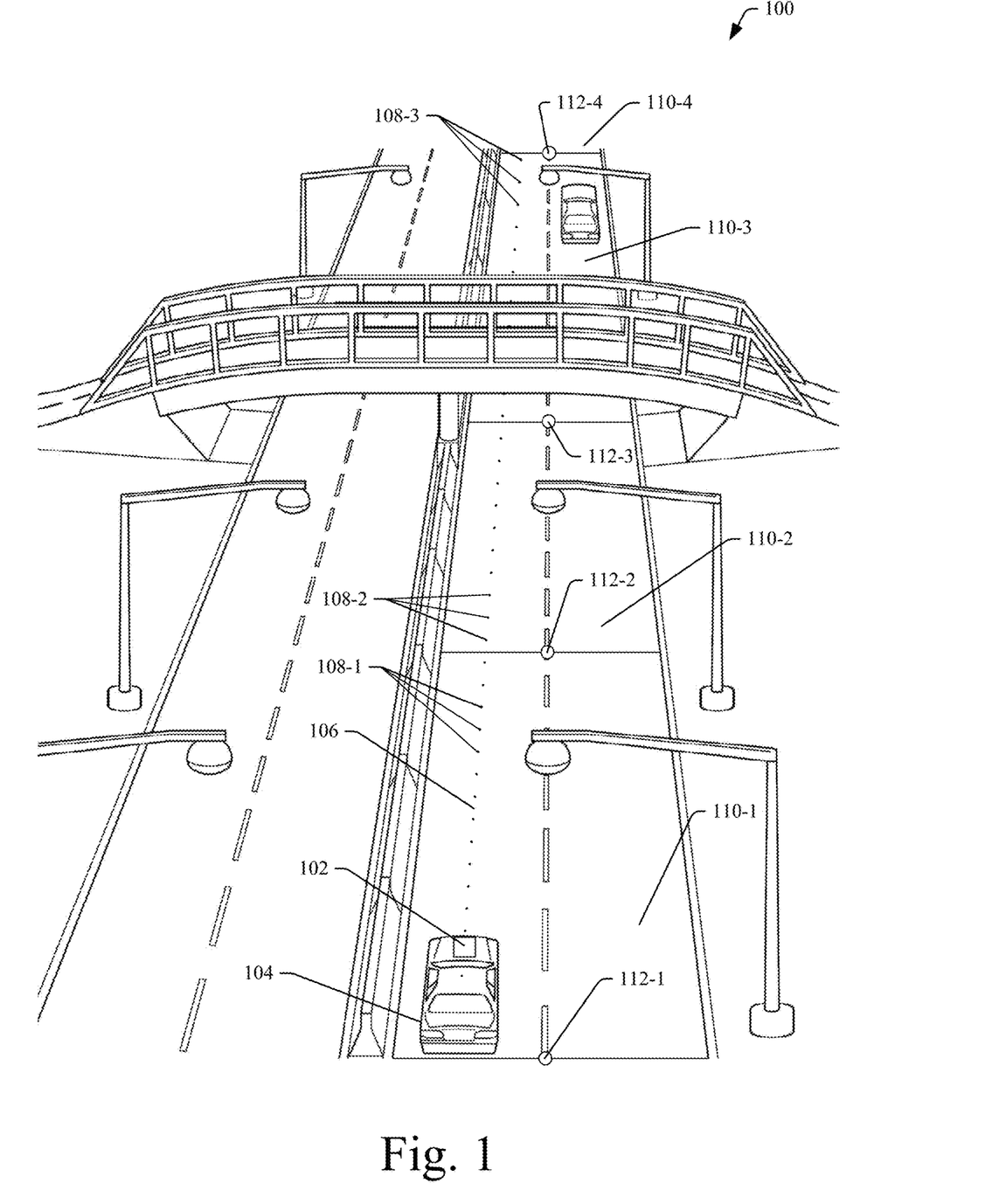
FIG. 1 is an example illustration of an environment in which world geodetic system to cartesian coordinate conversion for driving may be implemented, in accordance with techniques of this disclosure.

FIG. 1 is an example illustration 100 of an environment in which world geodetic system to cartesian coordinate conversion may be implemented. The example illustration 100 shows a conversion module 102 of a system (not shown) implemented within a vehicle 104. The vehicle 104 is traveling or is going to travel along a path 106 with path points 108. The path points are organized or associated with a plurality of LGSs 110. For example, path points 108-1 may be associated with LGS 110-1, path points 108-2 may be associated with LGS 110-2, and path point 108-3 may be associated with LGS 110-3.

The LGSs 110 are portions of groups of lanes that are in a same travel direction, not split, and have unchanging lane markers. The LGSs 110 may comprise pluralities of lines (e.g., vectors of points). In some implementations, the LGSs 110 may contain both WGS and cartesian coordinates. Each of the LGSs 110 has an origin 112 that is predetermined (e.g., LGS 110-1 has origin 112-1, LGS 110-2 has origin 112-2, and LGS 110-3 has origin 112-3). The origins 112 are shown as being centered laterally in the LGSs 110 and at the beginnings of each of the LGSs 110. The locations of the origins 112 relative to the LGSs 110 may vary without departing from the scope of this disclosure.

Each of the LGSs 110 also has a set of constants that are pre-calculated for the respective LGS 110. The constants are based on the locations of the origins 112 of the respective LGSs 110 and are used to convert the WGS coordinates of the path points 108 to cartesian coordinates, as discussed further below. By using the LGS structure and the pre-calculated constants, the path points 108 can be accurately converted to cartesian coordinates across large distances and boundaries and with non-cumbersome equations, which may improve driving.

Example System

Figure 2:
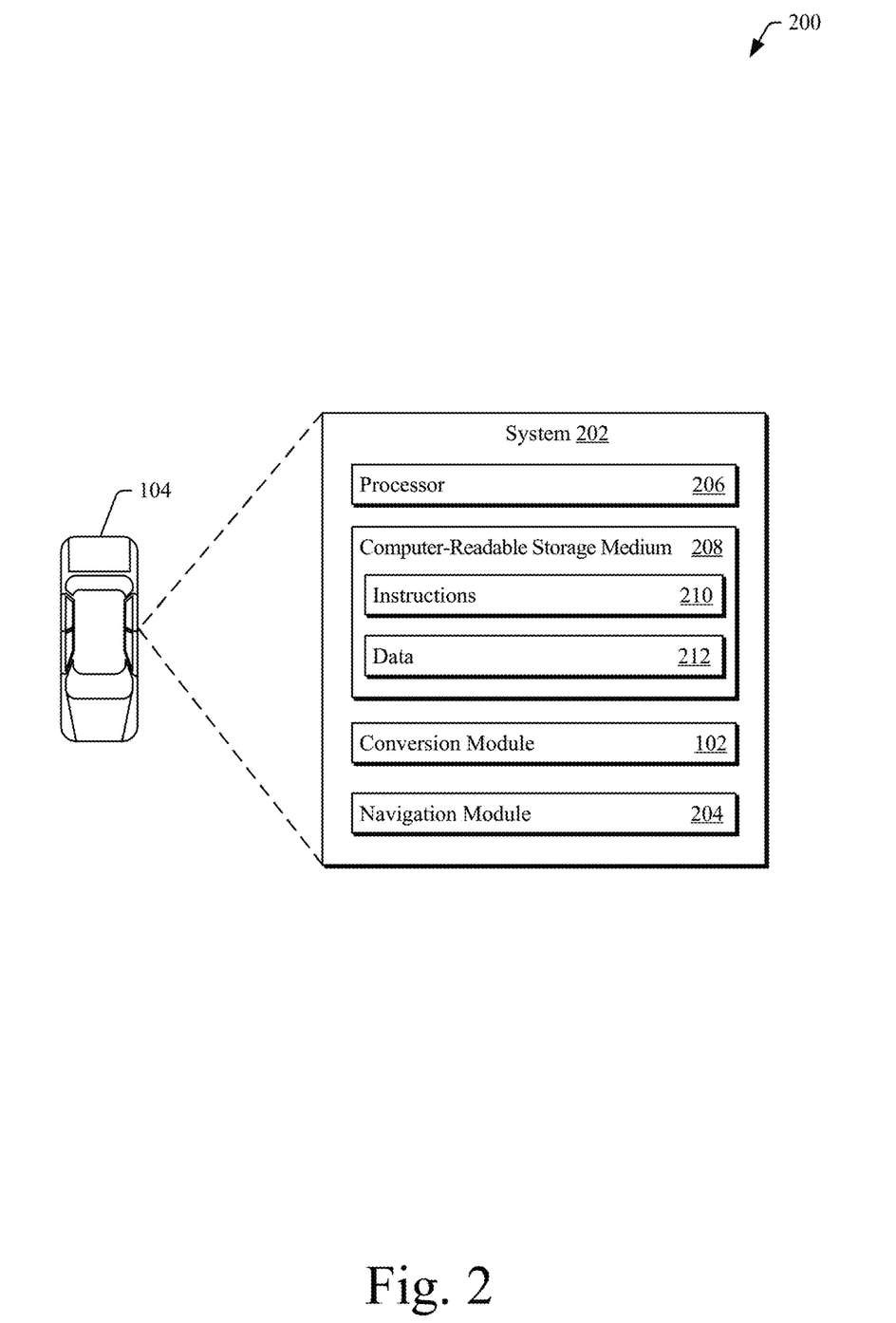
FIG. 2 is an example illustration of a system configured to perform world geodetic system to cartesian coordinate conversion for driving, in accordance with techniques of this disclosure.

FIG. 2 is an example illustration 200 of a system 202 in which world geodetic system to cartesian coordinate conversion may be implemented. The system 202 is configured to be disposed in the vehicle 104 or portions of the system 202 may be separate from the vehicle 104 (e.g., cloud-based). Although the vehicle 104 is illustrated as a car, the vehicle 104 may comprise any vehicle (e.g., a truck, bus, boat, or plane) without departing from the scope of this disclosure.

The system 202 includes the conversion module 102 that is configured to convert WGS coordinates of the path points 108 of the path 106 to cartesian coordinates. The system 202 also includes a navigation module 204 that is configured to generate and provide the path points 108 to the conversion module 102. Along with the path points 108, the navigation module 204 is configured to provide data about the LGSs 110 of the path 106 (e.g., origins 112, constants, and which path points 108 belong to which LGS 110) to the conversion module 102.

In order to implement the conversion module 102 and the navigation module 204, the system 202 includes at least one processor 206 and at least one computer-readable storage medium 208. The processor 206 (e.g., application processor, microprocessor, digital-signal processor (DSP), or controller) executes instructions 210 (e.g., code) stored within the computer-readable storage medium 208 (e.g., non-transitory storage device such as a hard drive, SSD, flash memory, read-only memory (ROM), EPROM, or EEPROM) to cause the conversion module 102 and the navigation module 204 to perform the techniques described herein. The instructions 210 also cause the processor 206 to act upon (e.g., create, receive, modify, delete, transmit, or display) data 212 (e.g., application data, module data; sensor data, or I/O data). Although shown as being within the computer-readable storage medium 208, portions of the data 212 may be within a random-access memory (RAM) or a cache (not shown).

The conversion module 102 and/or the navigation module 204 may contain their own respective processors and computer-readable storage mediums. As such, the processor 206 may execute the instructions 210 to cause the respective processors to perform the techniques of the conversion module 102 and/or the navigation module 204 described herein. Conversely, the computer-readable storage medium 208 may comprise the conversion module 102 and/or the navigation module 204. As such, the processor 206 may perform the techniques of the conversion module 102 and/or the navigation module 204 described herein.

Example Data Flows

Figure 3:
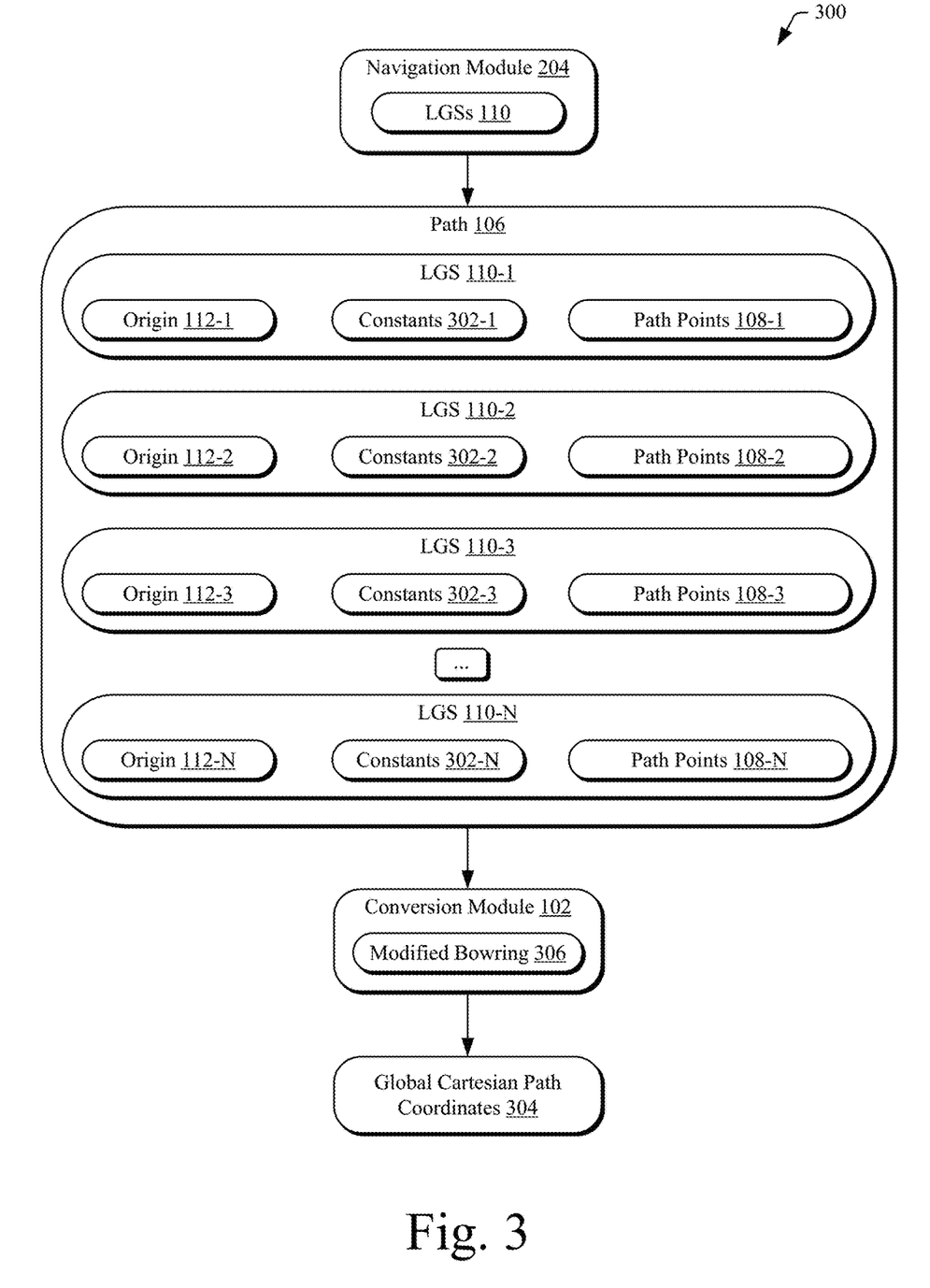
FIG. 3 is an example illustration of world geodetic system to cartesian coordinate conversion for driving, in accordance with techniques of this disclosure.

FIG. 3 is an example illustration 300 of world geodetic to cartesian coordinate conversion. The example illustration 300 shows aspects of the conversion module 102 and the navigation module 204 and data flows surrounding conversion module 102 and the navigation module 204 (between, into, and out of them). The example illustration 300 shows a coordinate conversion of the path points 108 of the path 106 from WGS coordinates to cartesian coordinates.

The navigation module 204 determines the path 106 along with the associated LGSs 110 (e.g., LGSs 110-1 through 110-n). The path 106 may contain or go through any number of LGSs 110. The navigation module 204 contains or has access to LGSs 110 other than those of the path 106. The path 106 may be determined using any number of techniques (e.g., fastest routes, traffic, real-time sensing, shortest distances, or driver preferences). The navigation module 204 provides, to the conversion module 102, the path 106 and information about the LGSs 110 corresponding to the path 106.

Each of the LGSs 110 of the path 106 contains a respective origin 112 in WGS coordinates, respective path points 108 in WGS coordinates, and respective constants 302. The path points 108 are included within the LGSs 110 for illustration purposes only. For example, the LGSs 110 stored by the navigation module 204 may only contain the respective origins 112 and the respective constants 302. When the path 106 is determined, portions of the path points 108 are associated with respective LGSs 110. As such, the LGSs 110 that are sent to the conversion module 102 are shown as containing the respective portions of the path points 108 for simplicity. In other words, the navigation module 204 may provide LGSs 110 and path points 108 with indications of associated LGSs 110 (if they have them) instead of LGSs 110 containing the path points 108, as illustrated.

The constants 302 comprise a combination of constants used in a traditional Bowring conversion and constants used to replace higher-order terms of the traditional Bowring conversion. For example, the constants 302 may comprise northing terms based on latitudes of the respective origins 112 of the LGSs 110, easting terms based on the latitudes of the respective origins 112 of the LGSs 110, earth radiuses at the latitudes of the respective origins 112 of the LGSs 110, and Bowring latitudes of the respective origins 112 of the LGSs 110. The northing and easting terms may be used to replace the higher-order terms of the traditional Bowring conversion. The constants 302 act as keys for determining the cartesian coordinates (e.g., global cartesian path coordinates 304).

The constants 302 are pre-calculated and stored as part of the LGSs 110 along with their respective origins 112 by the navigation module 204. For example, the constants 302 may be pre-calculated by a remote or cloud system (not shown) for all LGSs 110 of a map (e.g., country, continent, global). In order to do so, the remote or cloud system may determine origins 112 for each of the LGSs 110 of the map (e.g., centered and closest to a previous LGS) and calculate the constants 302 for each of the origins 112. The cloud system may then add the origins 112 and associated constants 302 to the LGSs 110 and provide the LGSs 110 including their respective origins 112 and constants 302 for use by the navigation module 204 (e.g., over the air, as a disc, when loading the navigation module 204).

The LGSs 110 that correspond to the path 106 (including their respective origins 112 in WGS coordinates and respective constants 302) along with their respective path points 108 in WGS coordinates are sent to the conversion module 102 that uses a modified Bowring conversion (e.g., Modified Bowring 306) to calculate the global cartesian path coordinates 304. The equations of the modified Bowring 306 are shown below, $$\text{Northing} = N^* R'^* \Delta\phi$$

$$\text{Easting} = E^* R'^* \cos(\phi'_0 + 0.5^* N^* \Delta)^* \Delta\lambda$$

where N is the northing term based on a latitude of the respective origin 112 (e.g., linearly related to $$\cos\left(\frac{\pi}{4} - \phi'_0\right),$$

E is easting term based on a latitude of the respective origin 112 (e.g., based on a conventional Bowring conversion), R' is the earth radius at the respective origin 112, $\phi'_0$ is the Bowring latitude of the respective origin 112, and the deltas are differences in WGS coordinates ($\phi$ is latitude and $\lambda$ is longitude).

Accordingly, the origins 112 and the constants 302 are used by the conversion module 102 to convert the respective path points 108 to the global cartesian path coordinates 304. In this way, accurate coordinate conversion can be achieved for a wide variety of paths without excess computational burden on the conversion module 102. Conversions of path points 108 through a plurality of adjacent LGS 110 are described below.

Figure 4:
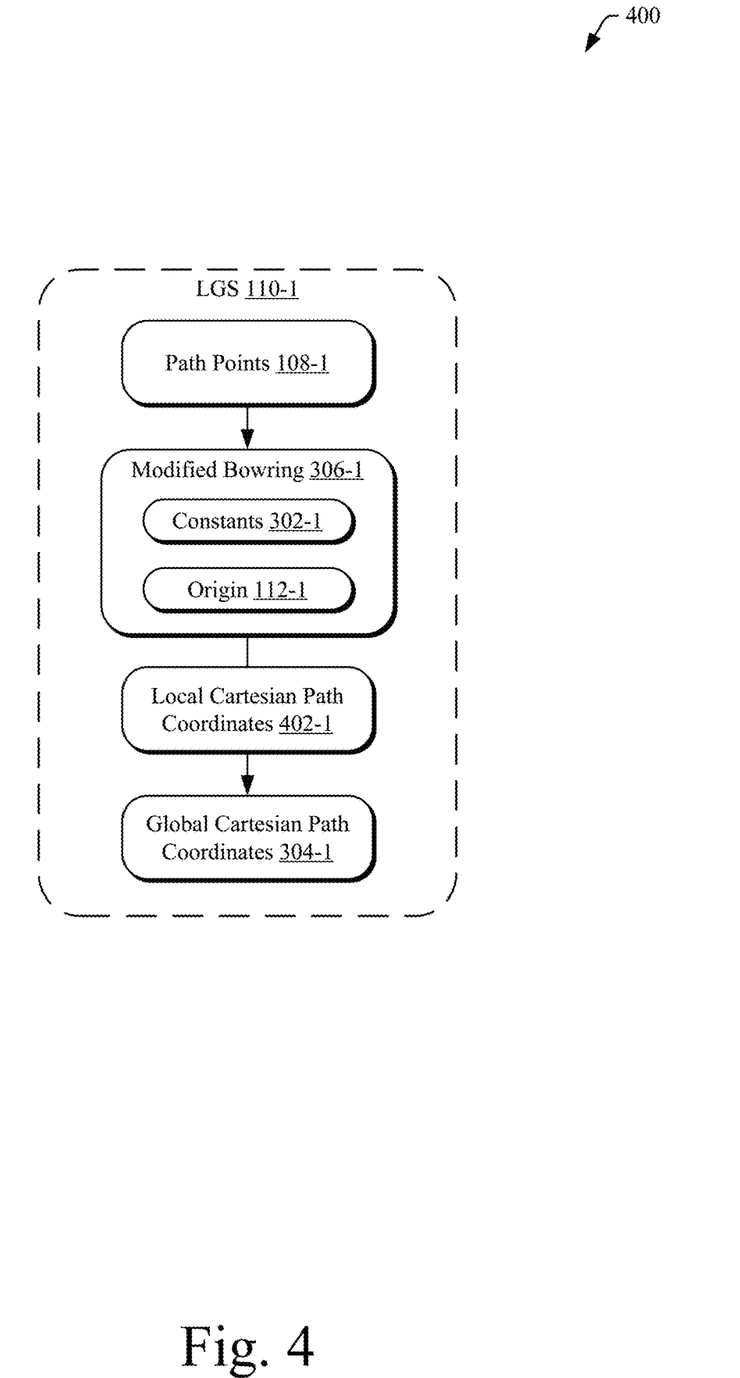
FIG. 4 is an example illustration of world geodetic system to cartesian coordinate conversion of a first LGS for driving, in accordance with the techniques of this disclosure.

FIG. 4 is an example illustration 400 of a conversion of path points 108-1 of or through LGS 110-1 from WGS to cartesian coordinates. The path points 108-1 are sequentially fed through the modified Bowring 306-1. The modified Bowring 306-1 uses constants 302-1 and the origin 112-1 to determine local cartesian path coordinates 402-1 that correspond to the path points 108-1. The deltas in the modified Bowring 306-1 correspond to differences between the WGS coordinates of the path points 108-1 and the origin 112-1. The local cartesian path coordinates 402 correspond to cartesian coordinates relative to the respective origin 112. For example, local cartesian path coordinates 402-1 correspond to cartesian coordinates relative to origin 112-1. In the example illustrations, the LGS 110-1 is the first LGS 110 of the path 106. As such, the origin 112-1 is set as having a global cartesian coordinate of zero. Because the origin 112-1 was set as cartesian zero, the local cartesian path coordinates 402-1 are the global cartesian path coordinates 304-1 for the path points 108-1.

Figure 5:
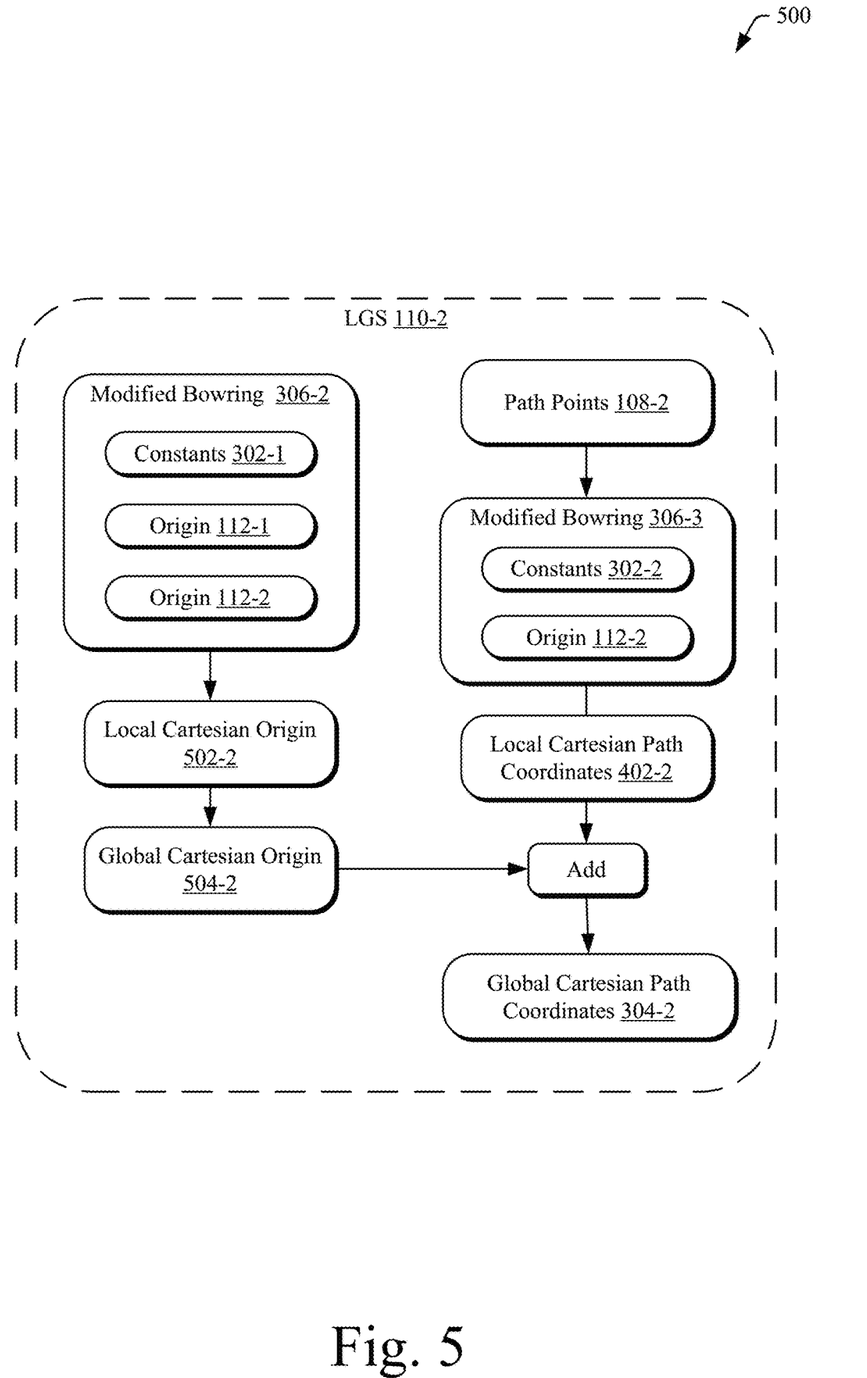
FIG. 5 is an example illustration of world geodetic system to cartesian coordinate conversion of a second LGS for driving, in accordance with the techniques of this disclosure.

FIG. 5 is an example illustration 500 of a conversion of path points 108-2 of LGS 110-2 from WGS to cartesian coordinates. Because the LGS 110-2 is not the first encountered by the vehicle 104, a local cartesian origin 502-2 is first determined for the LGS 110-2. In order to do so, the modified Bowring 306-2 is used with the constants 302-1 of LGS 110-1 and deltas between the origin 112-1 and the origin 112-2. Because the previous LGS 110 (LGS 110-1) contains the global cartesian zero, the local cartesian origin 502-2 is the global cartesian origin 504-2.

Once the global cartesian origin 504-2 is established, the path points 108-2 can be converted. In order to do so, the path points 108-2 are sequentially fed through the modified Bowring 306-3 using constants 302-2 and the origin 112-2. The deltas in the modified Bowring 306-3 correspond to differences between the WGS coordinates of the path points 108-2 and the origin 112-2. The output of the modified Bowring 306-3 is local cartesian path coordinates 402-2. The local cartesian path coordinates 402-2 correspond to cartesian coordinates relative to the origin 112-2. In order to get the global cartesian path coordinates 304-2 for the path points 108-2, the local cartesian path coordinates 402-2 are added to the global cartesian origin 504-2.

Figure 6:
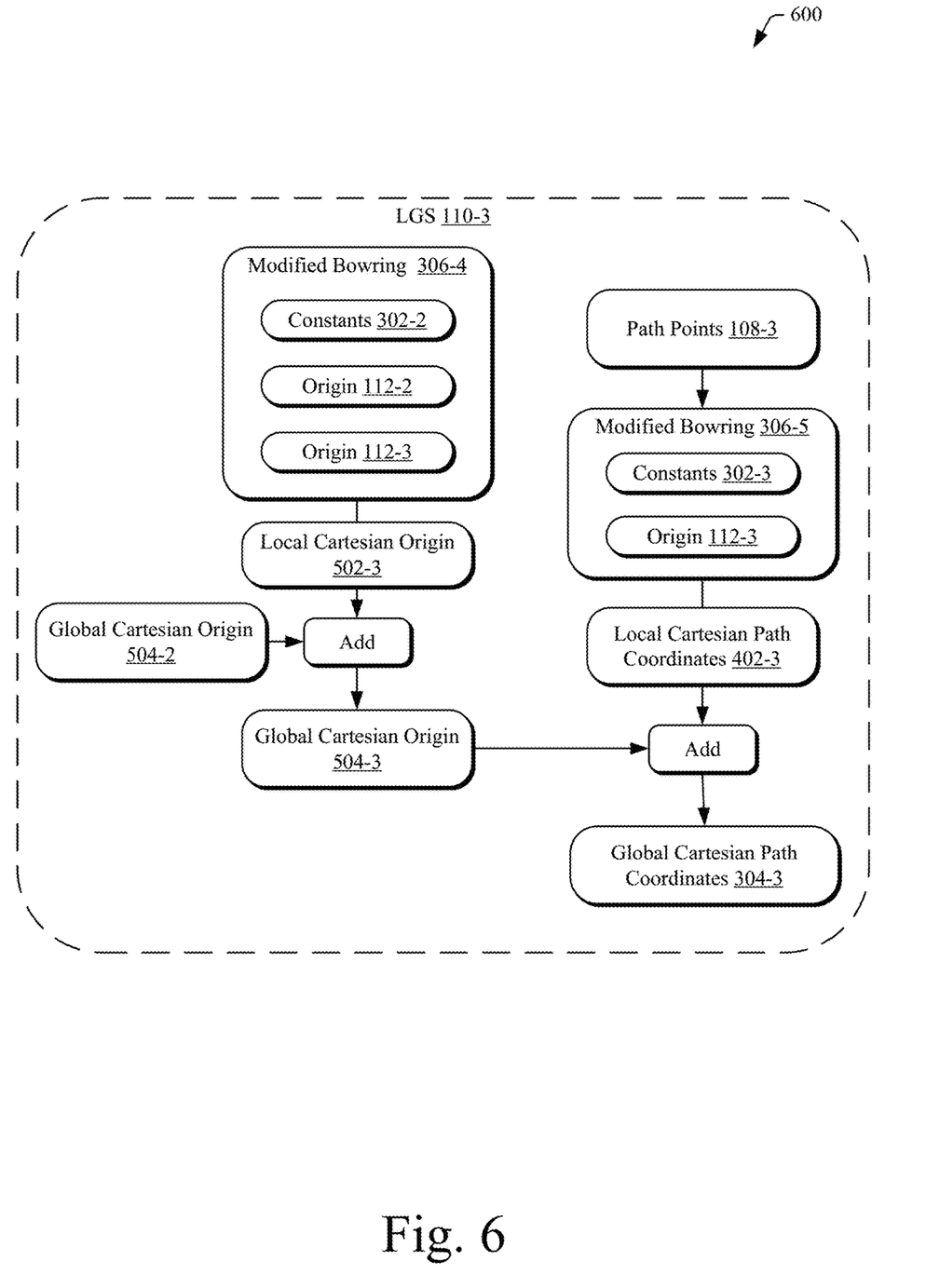
FIG. 6 is an example illustration of world geodetic system to cartesian coordinate conversion of a third LGS for driving, in accordance with the techniques of this disclosure.

FIG. 6 is an example illustration 600 of a conversion of path points 108-3 of LGS 110-3 from WGS to cartesian coordinates. Because the LGS 110-3 is not the first encountered by the vehicle 104, a local cartesian origin 502-3 must be determined for the LGS 110-3. In order to do so, the modified Bowring 306-4 is used with the constants 302-2 of LGS 110-2 and deltas between the origin 112-2 and the origin 112-3. Because the previous LGS 110 (LGS 110-2) does not contain the global cartesian zero, the local cartesian origin 502-3 is added to the global cartesian origin 504-2 to get the global cartesian origin 504-3.

Once the global cartesian origin 504-3 is established, the path points 108-3 can be converted. In order to do so, the path points 108-3 are sequentially fed through the modified Bowring 306-5 using constants 302-3 and the origin 112-3. The deltas in the modified Bowring 306-5 correspond to differences between the WGS coordinates of the path points 108-3 and the origin 112-3. The output of the modified Bowring 306-5 is local cartesian path coordinates 402-3. The local cartesian path coordinates 402-3 correspond to cartesian coordinates relative to the origin 112-3. In order to get the global cartesian path coordinates 304-3 for the path points 108-3, the local cartesian path coordinates 402-3 are added to the global cartesian origin 504-3.

Any more LGSs 110 along the path are handled similarly to LGS 110-3. The dashed values may increment by one for each new LGS 110, with the exception that the modified Bowring 306 may increment by two (e.g., the modified Bowrings 306 for an LGS 110-4 may be modified Bowrings 306-6 and 306-7). The process continues until there are no more LGSs 110 along the path 106.

The conversion module 102 may perform the conversions for all the path points 108 of the path 106 prior to beginning a navigation of the path 106, or the conversion module 102 may continually calculate cartesian coordinates for path points 108 ahead of the vehicle 104 (e.g., perform the conversion in real-time). For example, path points 108 may continually be added to the path 106 as the vehicle 104 progresses along the path 106. As such, a buffer of the global cartesian path coordinates 304 may be calculated and maintained ahead of the vehicle 104 as it navigates along the path 106.

If the path contains path points 108 that are not associated with an LGS 110 (e.g., path points 108 approaching LGS 110-1), the system may treat each consecutive path point 108 as a separate LGS. The origin 112-1 may still be set to cartesian zero, and the consecutive path points 108 may be sequentially treated as LGSs 110 back to a current location of the vehicle 104. It should be apparent that, in order to do so, the constants are calculated for each of the points that are not associated with an LGS 110. Also, the path points 108 that are not associated with an LGS become their own origins. As such, the global cartesian origins 504 become the global cartesian path coordinates 304 for those path points 108.

The modified Bowring 306 can also be used in reverse to easily obtain WGS coordinates from cartesian coordinates. For example, the equations can be solved for the deltas as functions of the cartesian coordinates. The cartesian coordinates may then be fed into the reverse equations to obtain the delta values, which can then be added to the respective origins 112 (that are in WGS coordinates) to obtain WGS coordinates. This can be especially useful if the original WGS coordinates of the path 106 are not stored.

By using the modified Bowring 306 along with pre-calculated constants 302 for respective origins 112 of LGSs 110, accurate and computationally simple coordinate conversion can be achieved for most possible paths. In this way, semi-autonomous and autonomous driving capabilities may be extended to paths that could not previously be accurately or easily converted.

Example Method

Figure 7:
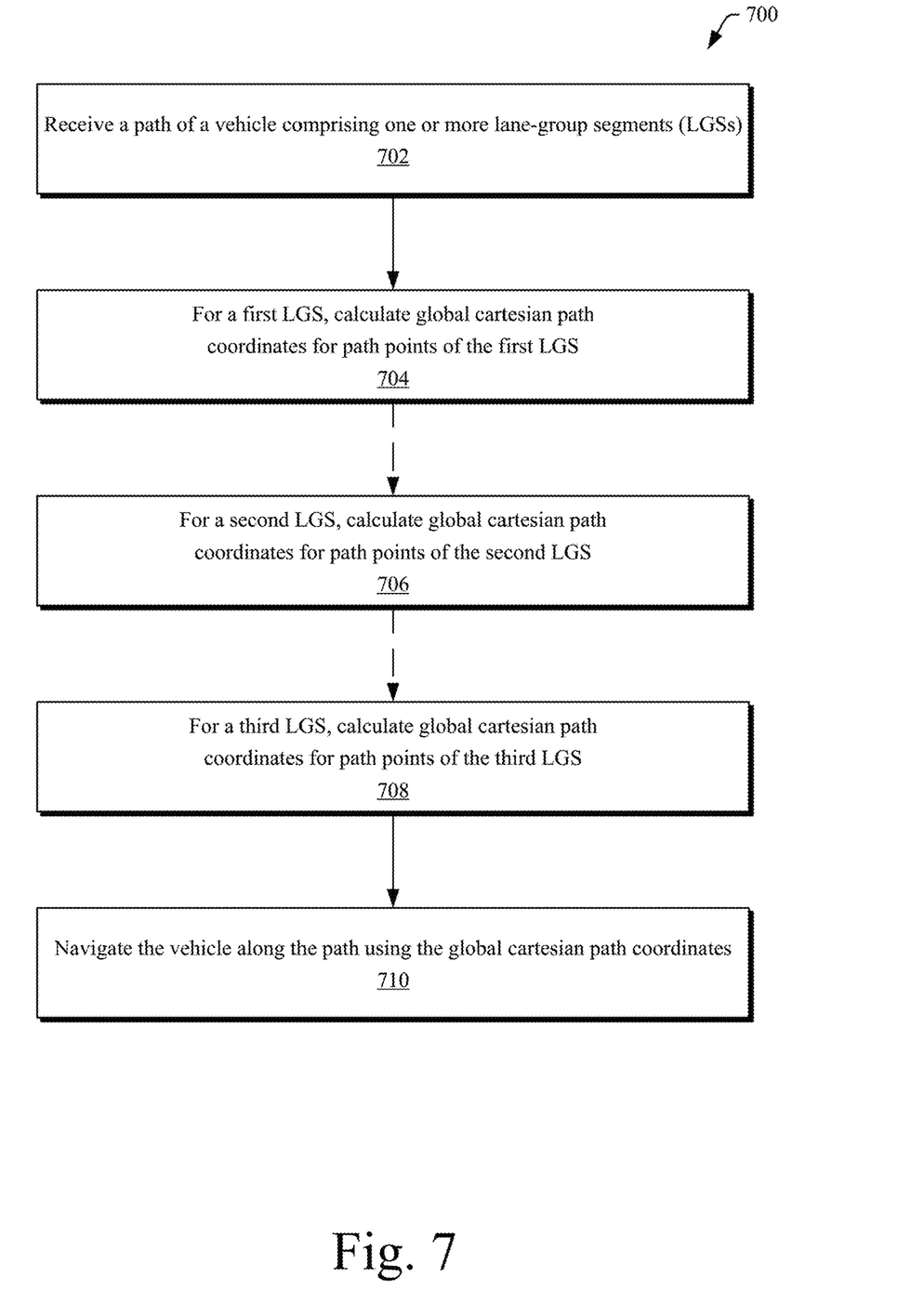
FIG. 7 is an example illustration of a method of world geodetic system to cartesian coordinate conversion for driving, in accordance with the techniques of this disclosure.

FIG. 7 is an example illustration 700 of a method for world geodetic system to cartesian coordinate conversion. Example illustration 700 may be implemented utilizing the previously described examples, such as the example illustrations 100, 300, 400, 500, and 600 and the system 202. Operations 702 through 710 may be performed by one or more entities (e.g., the conversion module 102 or other modules or components of the system 202). The order in which the operations are shown and/or described is not intended to be construed as a limitation, and any number or combination of the operations can be combined in any order to implement the method of example illustration 500 or an alternate method.

At 702, one or more LGSs of a path are received. The LGSs comprise respective origins in WGS coordinates, respective path points in WGS coordinates, and respective groups of constants. For example, the conversion module 102 may receive the LGSs 110-1 through 110-N of the path 106 from the navigation module 204.

At 704, global cartesian path coordinates are calculated for the path points of a first LGS based on the constants of the first LGS and respective differences between the path points of the first LGS and an origin of the first LGS. For example, the conversion module 102 may convert the path points 108-1 into the global cartesian path coordinates 304-1 using the modified Bowring 306-1, as discussed in regard to FIG. 4.

Optionally, at 706, global cartesian path coordinates are calculated for the path points of a second LGS based on the constants of the second LGS and respective differences between the path points of the second LGS and an origin of the second LGS. The global cartesian path coordinates are further based on a global cartesian origin calculated for the second LGS. For example, the conversion module 102 may convert the path points 108-2 into the global cartesian path coordinates 304-2 using the modified Bowrings 306-2 and 306-3, as discussed in regard to FIG. 5.

Optionally, at 708, global cartesian path coordinates are calculated for the path points of a third LGS based on the constants of the third LGS and respective differences between the path points of the third LGS and an origin of the third LGS. The global cartesian path coordinates are further based on a global cartesian origin calculated for the third LGS. The global cartesian origin for the third LGS is based on the global cartesian origin of the second LGS. For example, the conversion module 102 may convert the path points 108-3 into the global cartesian path coordinates 304-3 using the modified Bowrings 306-4 and 306-5, as discussed in regard to FIG. 6.

At 710, the vehicle is navigated along the path using the global cartesian path coordinates. For example, a semi-autonomous or autonomous driving module of the system 202 may receive the global cartesian path coordinates 304 and operate the vehicle 104 to follow the path 106.

By performing the above actions, accurate coordinate conversion can be accomplished over large distances, across boundaries, and regardless of latitude while reducing computational overhead. Consequently, advanced safety and semi-autonomous or autonomous vehicle navigation can be improved (e.g., accuracy over longer or continuous paths) and driver satisfaction increased (e.g., minimized time to convert coordinates) over conventional techniques.

Examples

Example 1: A method comprising: receiving, by a processor of a vehicle, a path of the vehicle comprising one or more lane-group segments (LGSs), the LGSs comprising: respective origins in World Geodetic System (WGS) coordinates; respective path points in WGS coordinates; and respective groups of constants; for a first LGS of the LGSs, calculating global cartesian path coordinates for the path points of the first LGS based on the constants of the first LGS and respective differences between the path points of the first LGS and an origin of the first LGS; and navigating the vehicle along the path using the global cartesian path coordinates calculated for the path points of the first LGS.

Example 2: The method of example 1, wherein the constants of the first LGS comprise: a northing term based on a latitude of the origin of the first LGS; an easting term based on the latitude of the origin of the first LGS; an earth radius at the latitude of the origin of the first LGS; and a Bowring latitude of the origin of the first LGS.

Example 3: The method of example 1 or 2, wherein the calculating the global cartesian path coordinates comprises executing a modified Bowring method.

Example 4: The method of any preceding example, wherein the northing and easting terms replace one or more higher-order terms of a Bowring method.

Example 5: The method of any preceding example, further comprising, for a second LGS of the LGSs that follows the first LGS in the path of the vehicle: calculating a global cartesian origin for the second LGS based on the constants of the first LGS and a difference between an origin of the second LGS and the origin of the first LGS; calculating local cartesian path coordinates for the path points of the second LGS based on the constants of the second LGS and respective differences between the path points of the second LGS and the origin of the second LGS; and adding the local cartesian path coordinates for the path points of the second LGS to the global cartesian origin for the second LGS to determine global cartesian path coordinates for the path points of the second LGS.

Example 6: The method of any preceding example, further comprising, for a third LGS of the LGSs that follows the second LGS in the path of the vehicle: calculating a local cartesian origin for the third LGS based on the constants of the second LGS and a difference between the origin of the third LGS and the origin of the second LGS; adding the local cartesian origin for the third LGS to the global cartesian origin for the second LGS to determine a global cartesian origin for the third LGS; calculating local cartesian path coordinates for the path points of the third LGS based on the constants for the third LGS and respective differences between the path points of the third LGS and the origin of the third LGS; adding the local cartesian path coordinates for the path points of the third LGS to the global cartesian origin of the third LGS to determine global cartesian path coordinates for the path points of the third LGS.

Example 7: The method of any preceding example, wherein the path does not go through the origin of the first LGS.

Example 8: The method of any preceding example: wherein the respective differences comprise numeric differences in WGS coordinates between the path points and the origin of the first LGS.

Example 9: The method of any preceding example, wherein the LGSs are portions of groups of lanes that are in a same travel direction, not split, and have unchanging lane markers.

Example 10: The method of any preceding, wherein the calculating the global cartesian path coordinates comprises setting the origin of the first LGS to a cartesian zero.

Example 11: A system configured to be implemented in a vehicle, the system comprising: a processor; and computer-readable storage media comprising instructions that, when executed by the processor, cause the processor to: receive a path of the vehicle comprising one or more lane-group segments (LGSs), the LGSs comprising: respective origins in World Geodetic System (WGS) coordinates; respective path points in WGS coordinates; and respective groups of constants; for a first LGS of the LGSs, calculate global cartesian path coordinates for the path points of the first LGS based on the constants of the first LGS and respective differences between the path points of the first LGS and an origin of the first LGS; and navigate the vehicle along the path using the global cartesian path coordinates calculated for the path points of the first LGS.

Example 12: The system of example 11, wherein the constants of the first LGS comprise: a northing term based on a latitude of the origin of the first LGS; an easting term based on the latitude of the origin of the first LGS; an earth radius at the latitude of the origin of the first LGS; and a Bowring latitude of the origin of the first LGS.

Example 13: The system of example 11 or 12, wherein the calculation of the global cartesian path coordinates comprises an execution of a modified Bowring method.

Example 14: The system of any of examples 11-13, wherein the northing and easting terms replace one or more higher-order terms of a Bowring method.

Example 15: The system of any of examples 11-14, wherein the instructions further cause the processor to, for a second LGS of the LGSs that follows the first LGS in the path of the vehicle: calculate a global cartesian origin for the second LGS based on the constants of the first LGS and a difference between an origin of the second LGS and the origin of the first LGS; calculate local cartesian path coordinates for the path points of the second LGS based on the constants of the second LGS and respective differences between the path points of the second LGS and the origin of the second LGS; and add the local cartesian path coordinates for the path points of the second LGS to the global cartesian origin for the second LGS to determine global cartesian path coordinates for the path points of the second LGS.

Example 16: The system of any of examples 11-15, wherein the instructions further cause the processor to, for a third LGS of the LGSs that follows the second LGS in the path of the vehicle: calculate a local cartesian origin for the third LGS based on the constants of the second LGS and a difference between the origin of the third LGS and the origin of the second LGS; add the local cartesian origin for the third LGS to the global cartesian origin for the second LGS to determine a global cartesian origin for the third LGS; calculate local cartesian path coordinates for the path points of the third LGS based on the constants for the third LGS and respective differences between the path points of the third LGS and the origin of the third LGS; and add the local cartesian path coordinates for the path points of the third LGS to the global cartesian origin of the third LGS to determine global cartesian path coordinates for the path points of the third LGS.

Example 17: The system of any of examples 11-16, wherein the path does not go through the origin of the first LGS.

Example 18: The system of any of examples 11-17, wherein the respective differences comprise numeric differences in WGS coordinates between the path points and the origin of the first LGS.

Example 19: The system of any of examples 11-18, wherein the LGSs are portions of groups of lanes that are in a same travel direction, not split, and have unchanging lane markers.

Example 20: The system of any of examples 11-19, wherein the calculation of the global cartesian path coordinates comprises setting the origin of the first LGS to a cartesian zero.

Although implementations of world geodetic system to cartesian coordinate conversion have been described in language specific to certain features and/or methods, the subject of the appended claims is not necessarily limited to the specific features or methods described. Rather, the specific features and methods are disclosed as example implementations of world geodetic system to cartesian coordinate conversion. Further, although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples.

What is claimed is:

1. A method comprising:
receiving, by a processor of a vehicle, a path of the vehicle comprising a plurality of lane-group segments (LGSs), the LGSs comprising:
respective origins in World Geodetic System (WGS) coordinates;
respective path points in WGS coordinates; and
respective groups of constants comprising:
respective geocentric latitudes of the origins of the LGSs;
respective northing terms based on the geocentric latitudes of the
origins of the LGSs;
respective easting terms based on the geocentric latitudes of the origins of the LGSs; and
respective earth radiuses at the geodetic latitudes of the origins of the LGSs;
converting the path points from WGS coordinates to global cartesian path coordinates by:
for a first LGS of the LGSs, calculating global cartesian path coordinates for the path points of the first LGS based on the constants of the first LGS and respective differences between the path points of the first LGS and an origin of the first LGS;
for a second LGS of the LGSs that follows the first LGS in the path of the vehicle:
calculating a global cartesian origin for the second LGS based on the constants of the first LGS and a difference between an origin of the second LGS and the origin of the first LGS;
calculating local cartesian path coordinates for the path points of the second LGS based on the constants of the second LGS and respective differences between the path points of the second LGS and the origin of the second LGS; and
adding the local cartesian path coordinates for the path points of the second LGS to the global cartesian origin for the second LGS to determine global cartesian path coordinates for the path points of the second LGS; and
navigating the vehicle along the path using the global cartesian path coordinates calculated for the path points of the first LGS and the second LGS.

2. The method of claim 1, wherein the calculating the global cartesian path coordinates comprises executing a modified Bowring conversion where one or more of the constants replace one or more higher-order terms of a traditional Bowring conversion.

3. The method of claim 2, wherein the northing and easting terms replace the higher-order terms.

4. The method of claim 1, further comprising, for a third LGS of the LGSs that follows the second LGS in the path of the vehicle:
calculating a local cartesian origin for the third LGS based on the constants of the second LGS and a difference between the origin of the third LGS and the origin of the second LGS;
adding the local cartesian origin for the third LGS to the global cartesian origin for the second LGS to determine a global cartesian origin for the third LGS;
calculating local cartesian path coordinates for the path points of the third LGS based on the constants for the third LGS and respective differences between the path points of the third LGS and the origin of the third LGS; and
adding the local cartesian path coordinates for the path points of the third LGS to the global cartesian origin of the third LGS to determine global cartesian path coordinates for the path points of the third LGS.

5. The method of claim 1, wherein the path does not go through the origin of the first LGS.

6. The method of claim 1, wherein
the differences comprise numeric differences in WGS coordinates between the path points and the origins of the LGSs.

7. The method of claim 1, wherein the LGSs are portions of groups of lanes that are in a same travel direction, not split, and have unchanging lane markers.

8. The method of claim 1, wherein the calculating the global cartesian path coordinates comprises setting the origin of the first LGS to a cartesian zero.

9. A system configured to be implemented in a vehicle, the system comprising:
a processor; and
computer-readable storage media comprising instructions that, when executed
by the processor, cause the processor to:
receive a path of the vehicle comprising a plurality of lane-group segments (LGSs), the LGSs comprising:
respective origins in World Geodetic System (WGS) coordinates;
respective path points in WGS coordinates; and
respective groups of constants comprising:
respective geocentric latitudes of the origins of the LGSs;
respective northing terms based on the geocentric latitudes
of the origins of the LGSs;
respective easting terms based on the geocentric latitudes of the origins of the LGSs; and
respective earth radiuses at the geodetic latitudes of the origins of the LGSs;
convert the path points from WGS coordinates to global cartesian path coordinates by:
for a first LGS of the LGSs, calculate global cartesian path coordinates for the path points of the first LGS based on the constants of the first LGS and respective differences between the path points of the first LGS and an origin of the first LGS;
for a second LGS of the LGSs that follows the first LGS in the path of the vehicle:
calculate a global cartesian origin for the second LGS based on the constants of the first LGS and a difference between an origin of the second LGS and the origin of the first LGS;
calculate local cartesian path coordinates for the path points of the second LGS based on the constants of the second LGS and respective differences between the path points of the second LGS and the origin of the second LGS; and
add the local cartesian path coordinates for the path points of the second LGS to the global cartesian origin for the second LGS to determine global cartesian path coordinates for the path points of the second LGS; and
navigate the vehicle along the path using the global cartesian path coordinates calculated for the path points of the first LGS.

10. The system of claim 9, wherein the calculation of the global cartesian path coordinates comprises an execution of a modified Bowring conversion where one or more of the constants replace one or more higher-order terms of a traditional Bowring conversion.

11. The system of claim 10, wherein the northing and easting terms replace the higher-order terms.

12. The system of claim 9, wherein the instructions further cause the processor to, for a third LGS of the LGSs that follows the second LGS in the path of the vehicle:
calculate a local cartesian origin for the third LGS based on the constants of the second LGS and a difference between the origin of the third LGS and the origin of the second LGS;
add the local cartesian origin for the third LGS to the global cartesian origin for the second LGS to determine a global cartesian origin for the third LGS;
calculate local cartesian path coordinates for the path points of the third LGS based on the constants for the third LGS and respective differences between the path points of the third LGS and the origin of the third LGS; and
add the local cartesian path coordinates for the path points of the third LGS to the global cartesian origin of the third LGS to determine global cartesian path coordinates for the path points of the third LGS.

13. The system of claim 9, wherein the path does not go through the origin of the first LGS.

14. The system of claim 9, wherein the differences comprise numeric differences in WGS coordinates between the path points and the origins of the LGSs.

15. The system of claim 9, wherein the LGSs are portions of groups of lanes that are in a same travel direction, not split, and have unchanging lane markers.

16. The system of claim 9, wherein the calculation of the global cartesian path coordinates comprises setting the origin of the first LGS to a cartesian zero.

17. The method of claim 1, wherein:
the northing terms are a function of the geocentric latitudes of the origins; and the easting terms are based on a traditional Bowring conversion.

18. The system of claim 9, wherein:
the northing terms are a function of the geocentric latitudes of the origins;
and the easting terms are based on a traditional Bowring conversion applied to the latitudes of the origins.

19. The method of claim 1, wherein the constants are stored in a map.

20. The system of claim 9, wherein the constants are stored in a map.

* * * * *

UNITED STATES PATENT AND TRADEMARK OFFICE
CERTIFICATE OF CORRECTION

| | | |
|---|---|---|
| PATENT NO. | : 11,976,926 B2 | Page 1 of 1 |
| APPLICATION NO. | : 17/367265 | |
| DATED | : May 7, 2024 | |
| INVENTOR(S) | : Matthew R. Smith et al. | |

It is certified that error appears in the above-identified patent and that said Letters Patent is hereby corrected as shown below:

In the Claims

Column 11, Claim 1, Line 13: after "the", delete "¶"

Column 11, Claim 1, Line 22: delete "fora" and insert --for a-- therefor

Column 11, Claim 1, Line 40: after "to", delete "¶"

Column 12, Claim 9, Line 22: after "executed", delete "¶"

Column 12, Claim 9, Line 33: after "latitudes", delete "¶"

Column 14, Claim 15, Line 6: after "lane", delete "¶"

Column 14, Claim 18, Line 17: delete "origins;" and insert --origins; and-- therefor Column 14, Claim 18, Line 18: before "the", delete "and"

Column 14, Claim 18, Line 19: after "the", delete "¶"

Column 14, Claim 20, Line 23: after "claim 9,", delete "¶"

Signed and Sealed this
Eighth Day of April, 2025

Coke Morgan Stewart
*Acting Director of the United States Patent and Trademark Office*